United States Patent
Onodera et al.

[11] Patent Number: 6,076,254
[45] Date of Patent: Jun. 20, 2000

[54] APPARATUS FOR AUTOMATICALLY PRESSURE FITTING PARTS

[75] Inventors: Takeshi Onodera, Yamato; Yuetsu Obara, Shiki, both of Japan

[73] Assignee: Yuugenkaisha Tenshou, Yamato, Japan

[21] Appl. No.: 09/201,838

[22] Filed: Dec. 1, 1998

[30] Foreign Application Priority Data

Dec. 5, 1997 [JP] Japan .................................. 9-335795

[51] Int. Cl.[7] .................................................. B23P 19/02
[52] U.S. Cl. ................................ 29/714; 29/447; 29/798
[58] Field of Search .......................... 29/447, 716, 718, 29/788, 790, 791, 798, 799

[56] References Cited

U.S. PATENT DOCUMENTS

| | | |
|---|---|---|
| 3,556,743 | 1/1971 | Yeager . |
| 3,662,643 | 5/1972 | Scheffer . |
| 3,765,075 | 10/1973 | Olney, Jr. et al. . |
| 3,842,482 | 10/1974 | Stephens . |
| 4,027,370 | 6/1977 | Bachar . |
| 4,203,189 | 5/1980 | Rawson . |
| 4,672,735 | 6/1987 | Yamano et al. . |
| 5,072,518 | 12/1991 | Scott . |
| 5,186,776 | 2/1993 | Boyce et al. . |
| 5,266,258 | 11/1993 | Martin . |
| 5,455,986 | 10/1995 | Gentile . |
| 5,509,192 | 4/1996 | Ota et al. . |
| 5,566,436 | 10/1996 | Hirata . |

FOREIGN PATENT DOCUMENTS

| | | | |
|---|---|---|---|
| 47-46828 | 1/1970 | Japan | ........................................ 29/447 |
| 60-131135 | 7/1985 | Japan | ........................................ 29/718 |
| 435913 | 12/1974 | U.S.S.R. | .................................. 29/791 |

*Primary Examiner*—Irene Cuda
*Attorney, Agent, or Firm*—Oliff & Berridge, PLC

[57] ABSTRACT

The invention concerns an apparatus for automatically pressure fitting parts. In the apparatus, a work with part fitting holes is set on a work bench, and parts are fed to a predetermined position while being heated. The work bench is moved in an X- and a Y-direction to bring a part fitting hole of the work to a position underneath the predetermined position. A holder is then lowered, then is caused to take hold of the part at the predetermined position and pressure fit the part in the part fitting hole of the work held below, and then is pulled upward out of the part having been pressure fitted and secured in the position in the part fitting hole. Parts may be fed while being vibrated with an ultrasonic wave instead of being heated, and then may each be pressure fitted while being vibrated in a part fitting hole of the work, followed by pulling the holder upward out of the part having been pressure fitted and secured in the position in the part fitting hole.

18 Claims, 13 Drawing Sheets

APPARATUS FOR AUTOMATICALLY PRESSURE FITTING PARTS

TECHNICAL FIELD

The present invention relates to an apparatus for automatically pressure fitting such parts as female screws in part embedding holes of works, such as substrate covers and cases of personal computers and like communication sets.

BACKGROUND OF THE INVENTION

The covers and cases noted above are usually made of resins, and they have upright projections with central axial holes formed as part fitting holes. Metal female screws or like parts are pressure fitted and secured in position in such part fitting holes. Heretofore, such metal female screws were pressure fitted and secured in position in part fitting holes either manually or by using a machine.

In the prior art manual method of pressure fitting, metal parts a (FIGS. 14A) are set one by one in a predetermined orientation on a metallic parts array support, thus forming their lattice-like array thereon, and then they are heated to 200 to 500° C. by putting the parts array support on a heater. Then, the heated parts are each taken out of the parts array support with a pressure fitting tool b shown in FIG. 14A. Specifically, a holder (usually a plastic tube) c of the pressure fitting tool b is inserted into a threaded hole d of the part a. The pressure fitting tool b then pressure fits the part a in a part fitting hole f of a work e. The part a thus pressure fitted is hot enough to cause softening and migration of the resin of the work e around the hole f into grooves or recessed portions g, which are preliminarily formed in the outer periphery of the part a, and it is thus secured to the work e when the softened resin is solidified again. The softened resin is momentarily solidified again. Thus, even by pulling out the pressure fitting tool b from the part fitting hole f as soon as the part a is pressure fitted therein, the part a will not be pulled out together with the pressure fitting tool b but remain in the part fitting hole f.

In the prior art method of pressure fitting using a machine, a work is set on and secured to a work bench. In this state, a pressure fitting tool is caused to take hold of each of heated parts, then be moved to a position over a part fitting hole of the work and then be lowered. Each part held by the pressure fitting tool is thus pressure fitted and secured in position on a part fitting hole. The parts are thus pressure fitted one by one. Again in this case, the resin of the work around the part fitting hole with a part pressure fitted therein, is caused to soften and migrate to the part and solidified again.

The above prior art manual method had the following problems

The operation of manually setting parts one by one to form a lattice-like array on the parts array support, is very time-consuming.

It is more time-consuming and very cumbersome to take hold of each of the parts in the array on the parts array support and pressure fit the part in each part fitting hole by using the pressure fitting tool. Actually, not only an unskilled but also a skilled operator may slantedly or insufficiently pressure fit parts in part fitting holes, thus producing a rejected product. Besides, different operators will give rise to finish fluctuations even if they are all skilled. Furthermore, since a work usually has a plurality of part fitting holes, the manual operation may rise give to missed part fitting holes left without parts pressure fitted therein. The probability of missing is increased with increasing number of part fitting holes the work has. Moreover, the heating of the parts array support on the heater gives rise to the possibility of causing a burn to the operator due to careless operation.

The above prior art method using a machine had the following problems.

The pressure fitting tool for pressure fitting a part, which is moved while holding a part and is lowered and raised for the pressure fitting the part, requires provision of a part holding mechanism, a moving mechanism and a pressure fitting mechanism, thus complicating the overall mechanism. In addition, the pressure fitting tool may be brought to a deviated position form the position to pressure fit a part. Such deviation of position may result in slanted pressure fitting of a part or clogging during the pressure fitting and defective pressure fitting. Furthermore, the pressure fitting tool can pressure fit only a single kind of part in one operation cycle, i.e., one cycle sequence of movement and lowering and raising. Therefore, even by providing two or more pressure fitting tools, the operation efficiency cannot be improved because during the pressure fitting operation of one of these tools for pressure fitting a particular kind of part, the other tools can not be operated.

An object of the present invention is to provide an automatic parts pressure fitting apparatus, which can preclude the missing of part fitting holes left without pressure fitting parts therein, reduce such defective results as position deviation, insufficient pressure fitting and bending after pressure fitting, accurately and quickly pressure fit parts in part fitting holes, improve the operation efficiency, greatly reduce labor and ensure safe operation without any possibility for the operator to get burnt during operation.

SUMMARY OF THE INVENTION

A feature of the invention lies in setting a work with part fitting holes on a work bench, guiding parts fed to a predetermined position while heating the parts being guided, bringing a part fitting hole of the work to a position underneath the predetermined position by moving the work bench in X- and Y-axis directions, causing a holder to be lowered so as to take hold of the part at the predetermined position and pressure fit the part in the part fitting hole of the work underneath the predetermined position, and then be raised back out of the part, which has been pressure fitted and secured in position in the part fitting hole.

Another feature of the invention lies in guiding parts while vibrating the parts being guided with an ultrasonic wave instead of heating the parts, and causing the holder to be lowered for pressure fitting each part being vibrated in a part fitting hole of a work, and then be raised back out of the part, which is now pressure fitted and secured in position in the part fitting hole.

A further feature of the invention lies in the provision of a work bench for setting a work thereon, a driving mechanism for moving the work bench in an X- and a Y-axis direction, a parts guide, which parts to be pressure fitted in the work are fed along in a row, a heater for heating the parts being fed, a setting position where each heated part fed thereto is set, a holder capable of taking hold of the heated part set in the setting position and releasing the held part, a pressure fitting tool for lowering the holder, thereby causing the pressure fitting of the part held by the holder in a part fitting hole of the work, and a control system for controlling the operations of the work bench, the holder and the pressure fitting tool.

A still further feature of the invention lies in that the setting position where it is capable of being pushed open by the holder being lowered, thereby setting the held part to the lower level position, and being closed by a restoring member when it is released by the holder during the upward returning thereof past it.

A yet further feature of the invention lies in the pressure fitting tool is capable of being reciprocated by a magnet type rod-less cylinder.

A further feature of the invention lies in that the holder includes a rod capable of being inserted into a threaded hole of the parts, and an engagement ring fitted on the outer periphery of the rod at a position thereof near the lower end, the engagement ring having an outer diameter greater than the diameter of the rod and also the diameter of the threaded hole and also having a restoring force for changing its outer diameter.

A further feature of the invention lies in that the pressure fitting tool is capable of being held at a position to prohibit the feeding of parts, having been heated by the heater, to the setting position along the parts guide after the end of the pressure fitting of the last part in a part fitting hole of the work and until the start of the pressure fitting of parts in the next work.

A further feature of the invention lies in that the work bench includes a sucking mechanism for sucking the work by suction force exerted thereto from the back side.

A further feature of the invention lies in that the setting position has a part support surface, which is lower in level than the part support surface of the parts guide preceding it, and also has opposite side surfaces flaring upward such that the part on the part support surface will be raised along the opposite side surfaces when pushed by the next part fed by the parts guide.

A further feature of the invention lies in that whether a part has been set in the setting position is checked by a part sensor.

A further feature of the invention lies in that the pressure fitting tool is capable of being reciprocated by a magnet type rod-less cylinder, and being held at a position to prohibit the feeding of parts, having been heated by the heater, to the setting position along the parts guide after the end of the pressure fitting of the last part in a part fitting hole of the work and until the start of the pressure fitting of parts in the next work.

A further feature of the invention lies in that the pressure fitting tool is capable of being held at a position to prohibit the feeding of parts, having been heated by the heater, to the setting position along the parts guide after the end of the pressure fitting of the last part in a part fitting hole of the work and until the start of the pressure fitting of parts in the next work, and that the holder includes a rod capable of being inserted into a threaded hole of the parts, and an engagement ring fitted on the rod at a position thereof near the lower end, the engagement ring having an outer diameter greater than the diameter of the rod and also the diameter of the threaded hole and also having a restoring force for changing its outer diameter.

DETAILED DESCRIPTION OF PREFERRED EMBODIMENTS

Embodiment 1

Figure 1:
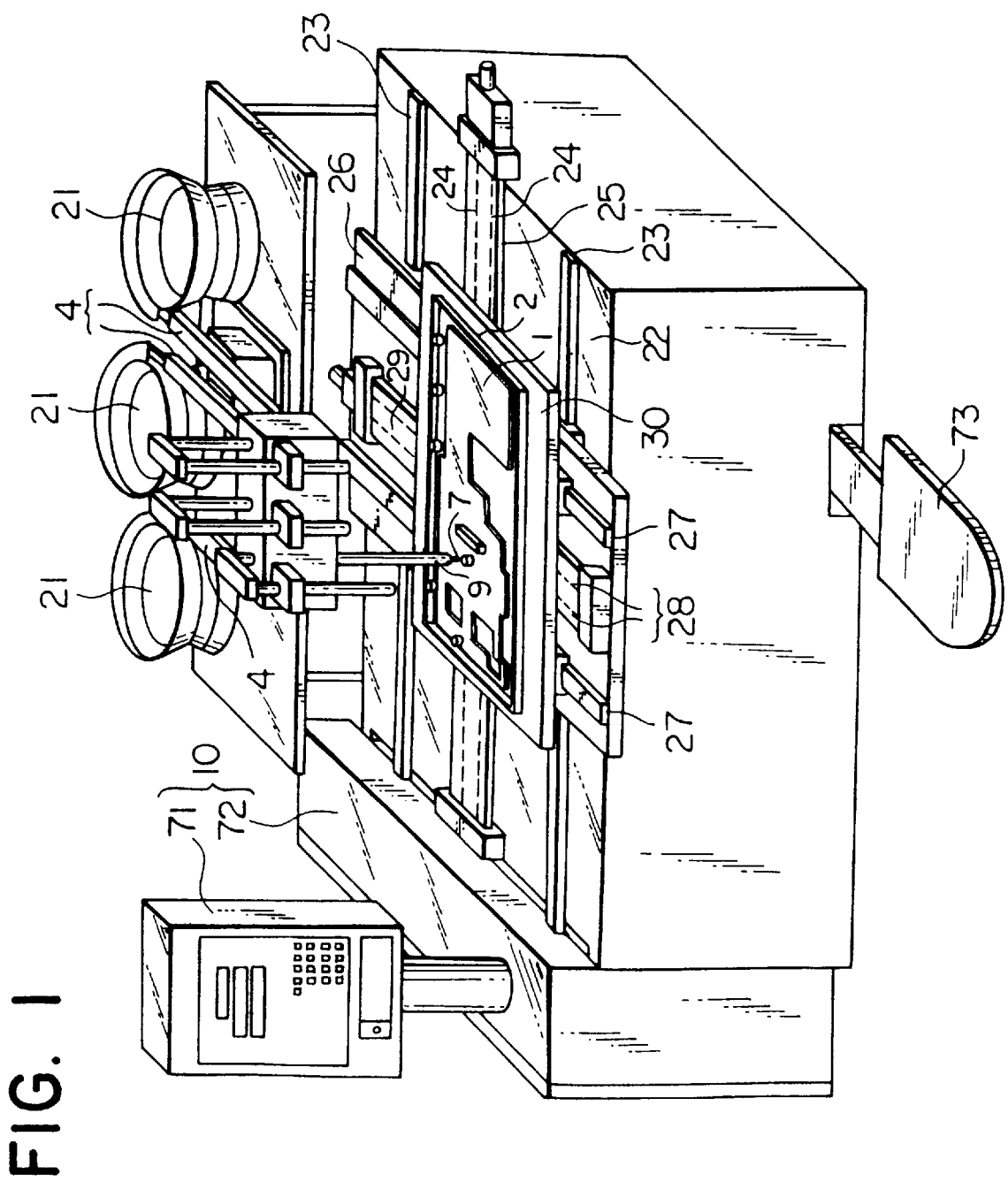
FIG. 1 is a perspective view showing a first embodiment of the automatic parts pressure fitting apparatus according to the invention.

A first embodiment of the apparatus for automatically pressure fitting parts according to the invention will now be described in detail with reference to FIGS. 1 to 7A and 7B. The illustrated apparatus for automatically pressure fitting parts comprises a work bench 2 for setting a work 1 thereon, a parts guide 4 for feeding parts in a row and in a predetermined orientation from parts feeders 21, a heater 5 for heating parts 3 being fed, a setting position 6 for setting a heated part 3 in a predetermined position, a holder 7 capable of taking hold of the part 3 set in the predetermined position of the setting position 6 and releasing the held part 3, a pressure fitting tool 9 for pressure fitting the part 3 held by the holder 7 in a part fitting hole 8 of the work 1 by lowering the tool tip 7, and a control system 10 for controlling the operations of the work bench 2, the holder 7 and the pressure fitting tool 9. Of these components, three sets are provided except for the work bench 2 and the control system 10.

As shown in FIG. 1, on top of a bed 22 two parallel X-axis rails 23 are laid. An X-axis screw shaft 24 is provided between the two X-axis rails 23 such that it is parallel thereto. A cover 25 covers the top of the X-axis screw shaft 24. An X-axis movable table 26 is provided on top of the cover 25. With forward rotation of the X-axis screw shaft 24 the X-axis movable table 26 is moved along the X-axis rails 23 in either direction, and with reverse rotation of the X-axis screw shaft 24 it is moved in the opposite direction. Two parallel Y-axis rails 27 are provided on top of the X-axis movable table 26 such that they cross the X-axis rails 23 at right angles thereto. An Y-axis screw shaft 28 is provided between the two Y-axis rails 27. Another cover 29 covers the top of the Y-axis screw shaft 28. A Y-axis movable table 30 is provided on top of the cover 29. With forward rotation of the Y-axis screw shaft 28 the Y-axis movable table 30 is moved along the Y-axis rails 27 in either direction, and with reverse rotation of the Y-axis screw shaft 28 it is moved in the opposite direction. The work bench 2 is provided on the Y-axis movable table 30, and is thus capable of being reciprocated in the X- and Y-axis directions.

Figure 2A:
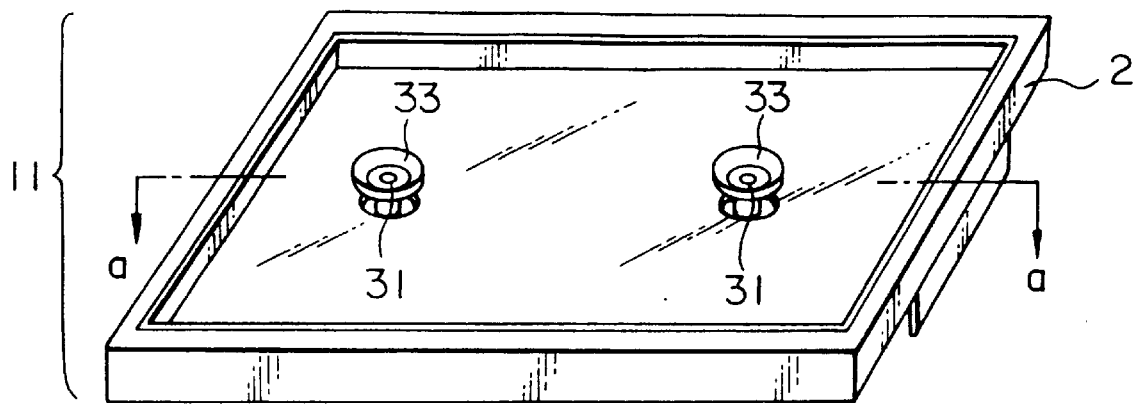
FIG. 2A is a perspective view showing a suction mechanism in the automatic parts pressure fitting apparatus according to the invention.
Figure 2B:
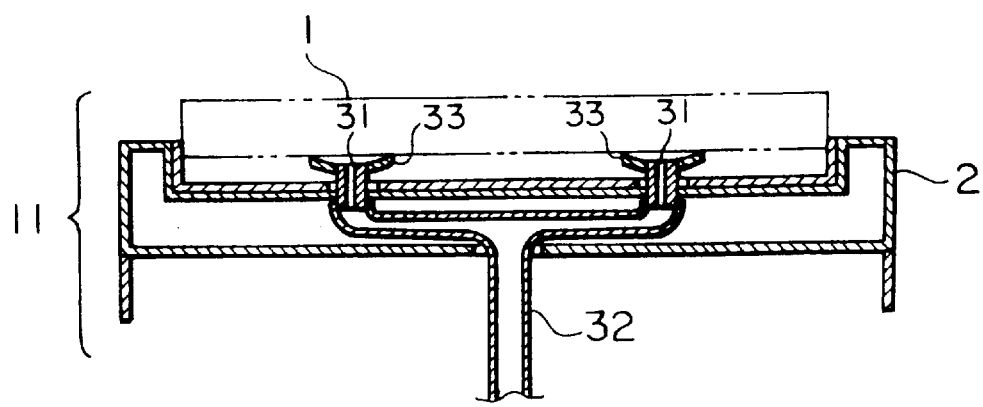
FIG. 2B is a sectional view taken along line a—a in FIG. 2A.

The work bench 2 which supports the work 1 set thereon, is made of hard rubber or a resin molding, so that it permits readily setting the work 1 on it. As shown in FIG. 2, the work bench 2 has two suction ports 31 penetrating it upward. On the back side of the work bench 2, the suction ports 31 are connected via a hose 32 to an air suction mechanism 11. An air suction unit (not shown) can withdraw air inside the hose 32 and thence inside the suction ports 31. As a result, the work 1 set on the work bench 2 is sucked by the suction ports 31 and held in close contact with suction members 33 mounted on the suction ports 31. In this way, the work 1 is secured to the work bench 2. More specifically, strains, deformations, bending and so forth of the work 1 which is made of a resin ;re corrected, and the work 1 is secured horizontally to the work bench 2. The hose 32 is adapted to follow the movement of the work bench 2 in the X- and Y-axis directions without being entangled or broken.

Figure 14A:
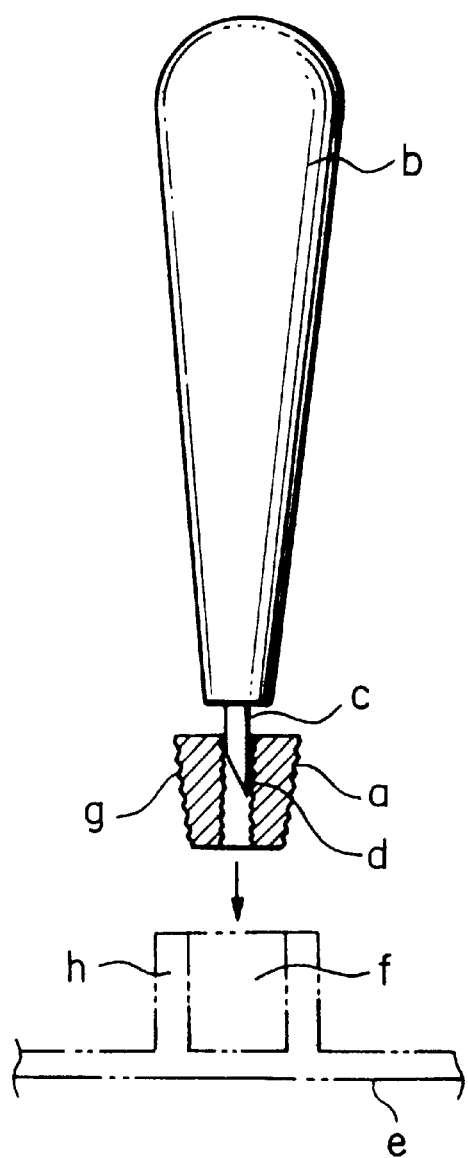
FIG. 14A is a view for describing a prior art manual method of pressure fitting a part in a work.
Figure 14B:
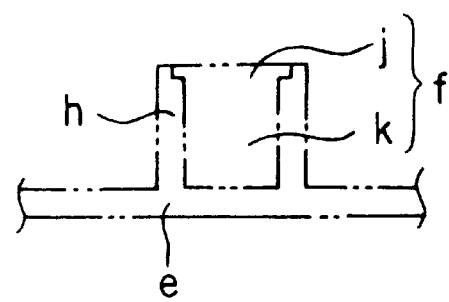
FIG. 14B is a view for describing a different example of the work.

The work 1 may be like conventional ones or novel in shape and structure. Generally, the work 1 is made of a resin, hard rubber or like material, so that it will be softened by a heated metal part pressure fitted in it, and migrate thereto before being solidified again. Examples of the work 1 are resin cases and covers of electronic apparatuses. These articles usually have an upright projection h, as shown in FIG. 14A or 14B, having a central part fitting hole f open at the top. The part fitting hole f may have a uniform diameter as shown in FIG. 14A, or has an upper large diameter portion j and a lower small diameter portion k communicating therewith as shown in FIG. 14B.

Figure 14C:
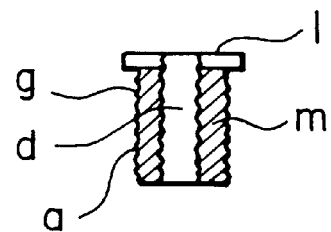
FIG. 14C is a view for describing a different example of the part.

The part to be pressure fitted in the part fitting hole 8 of the work 1 may be of various shapes and structures. FIGS. 14A and 14C show female screws as examples of the part. The female screw shown in FIG. 14A has a downwardly tapered outer periphery, which is formed with recessed portions g for resin migration thereto. The screw has a central thorough threaded hole. The female screw shown in FIG. 14C has a top flange 1 and a lower cylindrical portion m extending therefrom and having a smaller diameter. Again this screw has recessed portions formed in the outer periphery for resin migration and a central thorough threaded hole d.

Figure 3A:
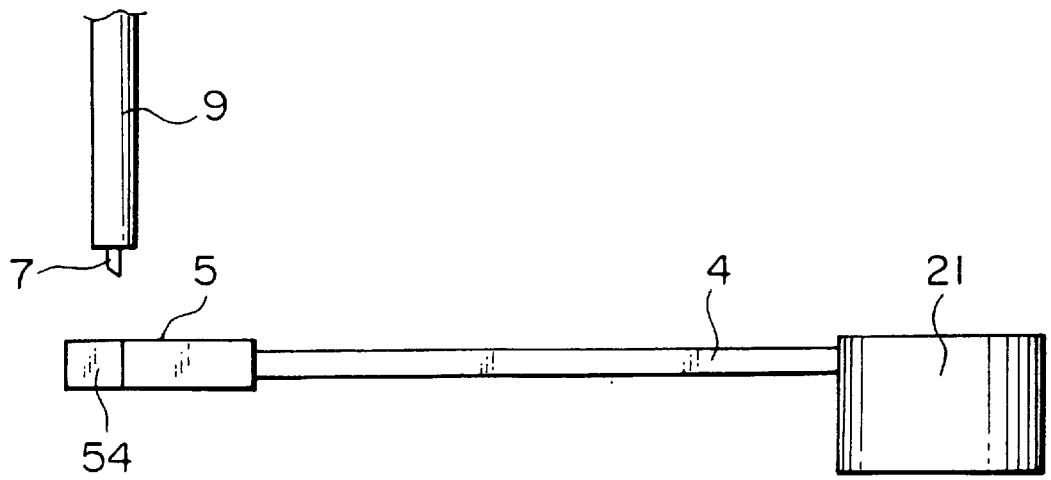
FIG. 3A is a view for describing the position relation among a parts guide, a heater and a setting position in the automatic parts pressure fitting apparatus according to the invention.
Figure 3B:
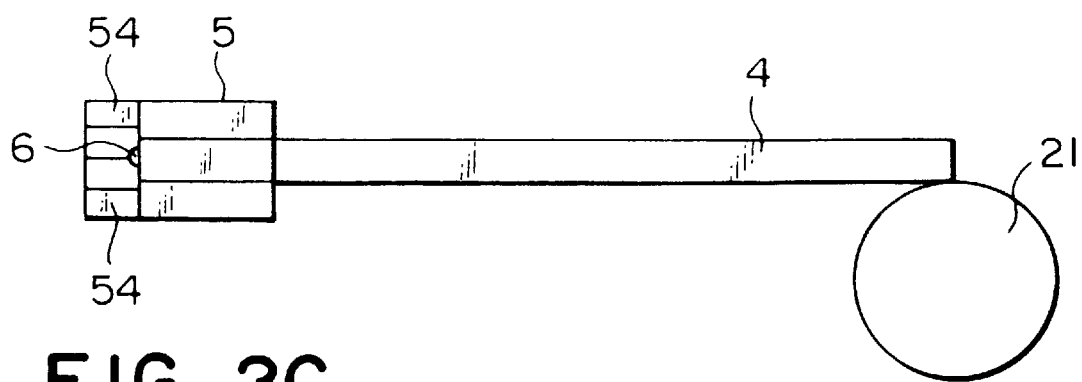
FIG. 3B is a front view showing the same position relationship.
Figure 3C:
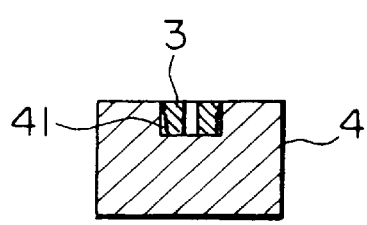
FIG. 3C is a sectional view showing an example of parts guide.
Figure 3D:
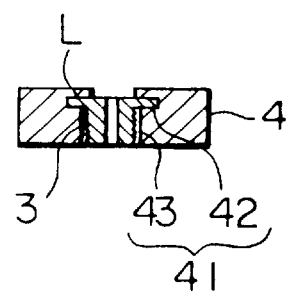
FIG. 3D is a sectional view showing a different example of parts guide.
Figure 4A:
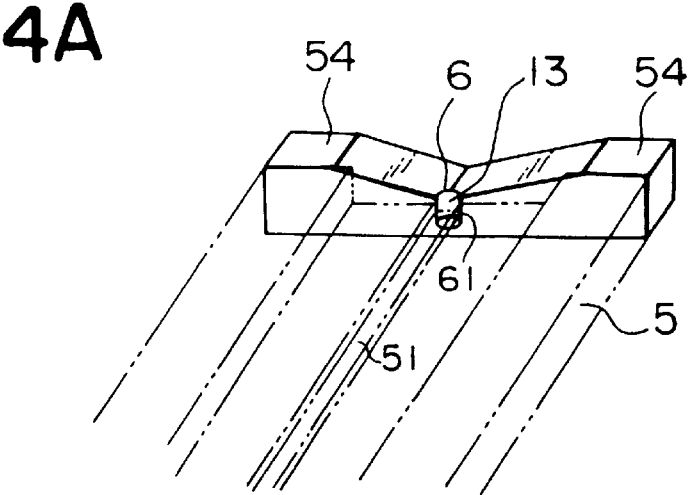
FIG. 4A is a perspective view showing the position relation between the heater and the setting position.
Figure 4B:
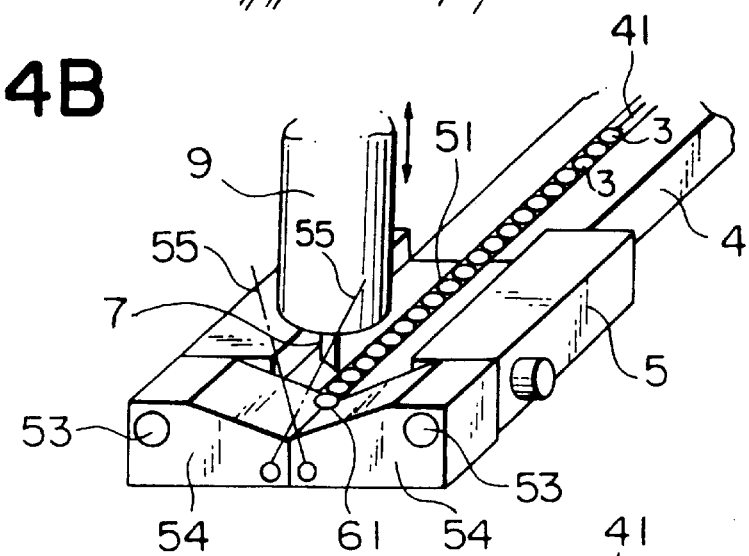
FIGS. 4B and 4C are views for describing the operations of the setting position and a pressure fitting tool.
Figure 4C:
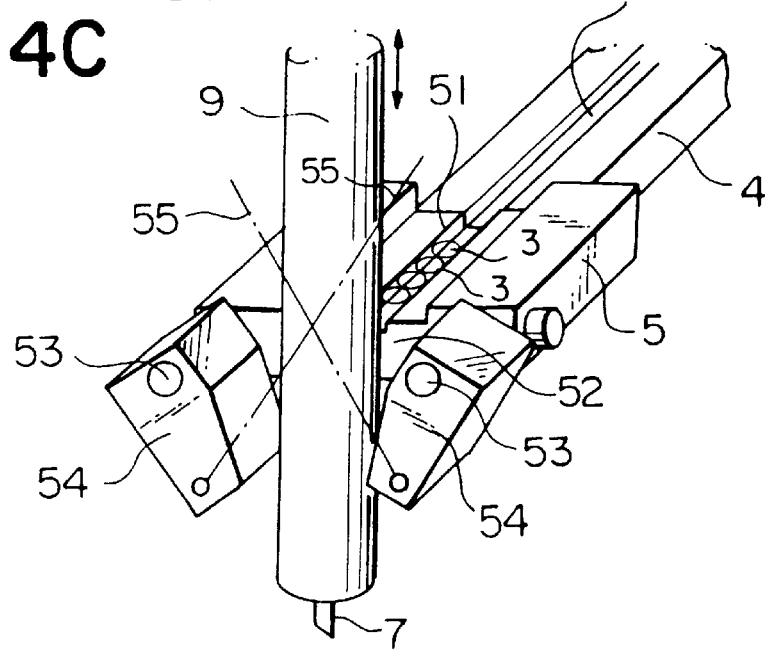

Parts 3 are fed out one by one in a row and with their head up from the parts feeder 21 to the parts guide 4. As shown in FIGS. 4B and 4C, the parts guide 4 is gutter-like, and has a guide groove 41. Parts 3 which are fed out into the feeding groove 41 are fed by being pushed by following parts 3 fed out in succession. FIG. 3C shows an example of parts guide, along which parts having a shape as shown in FIG. 14A are fed. In conformity to this part shape, the guide groove 41 has a rectangular sectional profile open at the top. FIG. 3D shows another example of parts guide, along which parts having a shape as shown in FIG. 14C are fed. In conformity to this part shape, the feeding groove 41 has a sectional profile having a wide portion 42, along which the flange 1 is guided, and a narrow portion 43.

As shown in FIGS. 4B and 4B, the parts guide 4 has a heater 5 provided as a leading end portion, which heats parts 3 being fed through it. The heater 5 has a guide groove 51, which the parts 3 are fed along. The heater is buried in the opposite side walls of the guide groove 51, and heats the parts 3 being fed through it to 200 to 500° C. The shape of the guide groove 51, like the shape of the feeding groove 41 of the parts guide 4, conforms the shape of the parts fed along the guide groove 51.

Figure 5A:
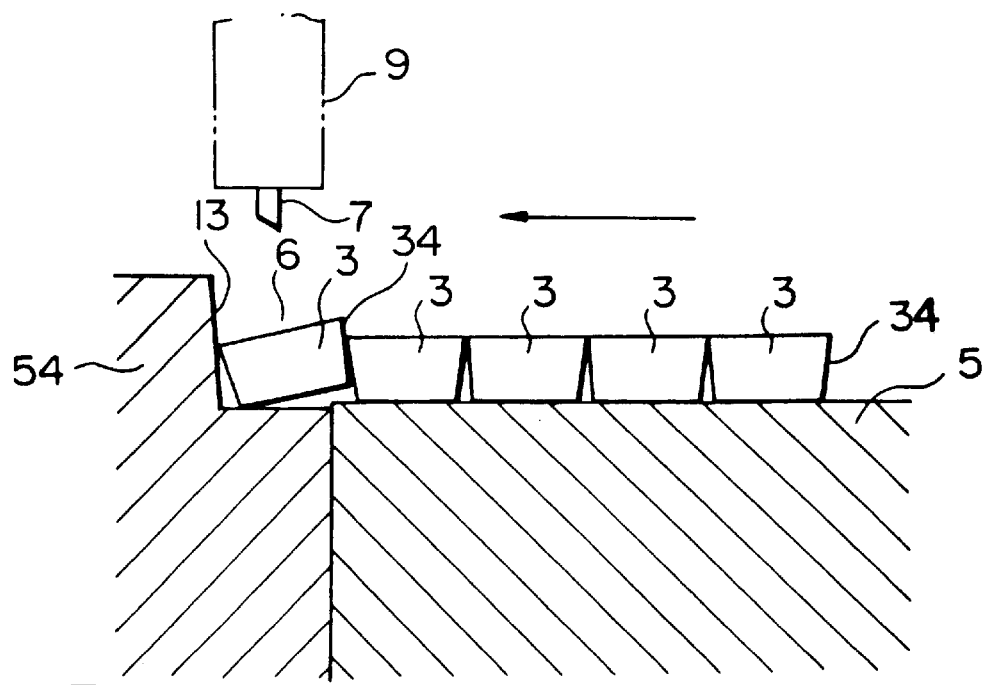
FIGS. 5A and 5B are views for describing a method of feeding and pressure fitting parts.
Figure 5B:
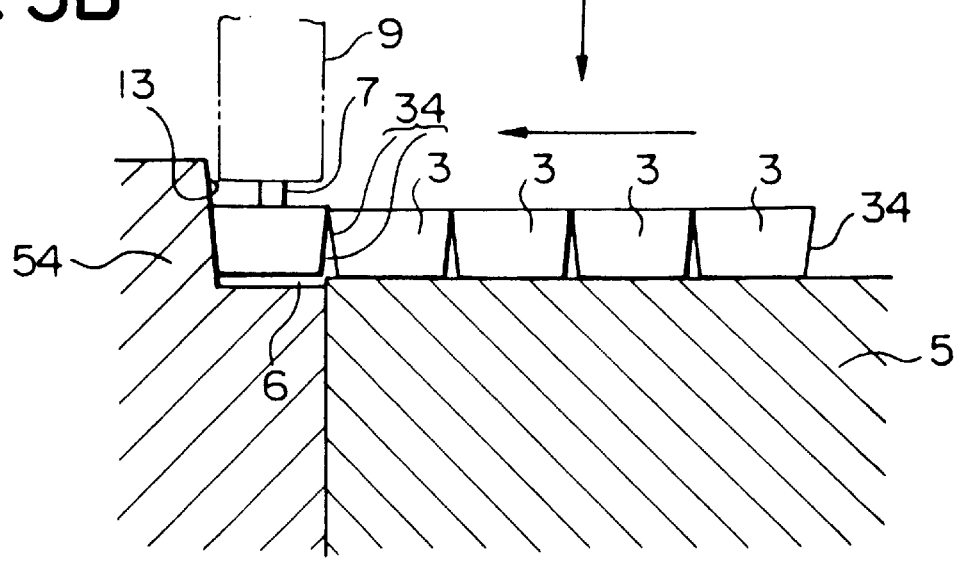

The parts 3 having been fed while being heated along the heater 5, reach a setting position 6 leading the heater 5. As shown in FIG. 4, the setting position 6 includes a pair of metal blocks 54 rotatably mounted by pins 53 on the leading end surface of the heater 5. As shown in FIGS. 5A and 5B, the two metal blocks 54 each have a recess 61. The bottoms of the recesses 61 form a part support surface, which is lower in level than the bottom of the guide groove 51 of the heater 5. The blocks 54 also have opposite side surfaces 13 upwardly flaring from the recesses 61. As shown in FIG. 4B, the blocks 54 are pulled upward by springs 55, and are thus held horizontally. In this state, the two recesses 61 are in a face-to-face relation to each other, thus forming a round recess capable of receiving and supporting a part 3. The bottom surfaces of the recesses 61 are set to be lower in level by about 0.1 mm than the bottom of the guide groove 51 of the heater 5. The inclination angle of the side surfaces 13 is preferably about one degree, although it varies with the angle of the outer periphery of the part 3. With the lower level bottom surfaces of the recesses 61 than the bottom of the guide groove 51 and also with the inclination of the opposite side surfaces 13, the part 3 that is fed from the guide groove 51 of the heater 5 into the setting position 6, is tilted with its leading portion down as shown in FIG. 5A. The outer periphery 34 of the part 3 in this state is pushed by the upper edge of the outer periphery 34 of the next part 3. As a result, titled part 3 is raised along the inclination of the opposite side surfaces 13 to a level higher than the level of the succeeding parts 3. With the part 3 thus brought to the raised state in the setting position 6, the pressure fitting tool 9 can push down only this raised part 3 without possibility that succeeding parts 3 are also pushed down. That is, the top of only the raised part 3 can be reliably pushed down.

As shown in FIG. 4C, when the part 3 in the setting position 6 is pushed down by the pressure fitting tool 9, the blocks 54 are turned downward about the pins 53 and opened, thus allowing the part 3 to be pushed down to and pressure fitted in the part fitting hole 8 of the work 1. In the vicinity of the setting position 6, a part sensor is provided, which checks whether a part 3 has been set in the setting position 6. If the part sensor fails to determine that the part 3 has been set in the setting position 6, the pressure fitting tool 9 is not lowered. That is, it is only when the part 3 set in the setting position 6 is detected that the pressure fitting tool 9 is lowered, thus preventing idle lowering of the pressure fitting tool 9.

The part 3 set in the setting position 6 is taken hold of by the holder 7. As shown in FIGS. 1 and 3A to 3D to 7A and 7B, the holder 7 is mounted on the tip, i.e., lower end, of the pressure fitting tool 9. FIGS. 1 and 3A to 3D and 5A and 5B show an example of holder 7 of tube type using a heat-resistant plastic tube. The tube has an outer diameter slightly greater than the diameter of the threaded hole of the part 3, and has a tapered tip so that it can be readily inserted into the threaded hole 62. When the holder 7 is inserted into the threaded hole 62, its outer periphery is in contact with the surface of the threaded hole 62, and thus it holds the part 3.

Figure 6A:
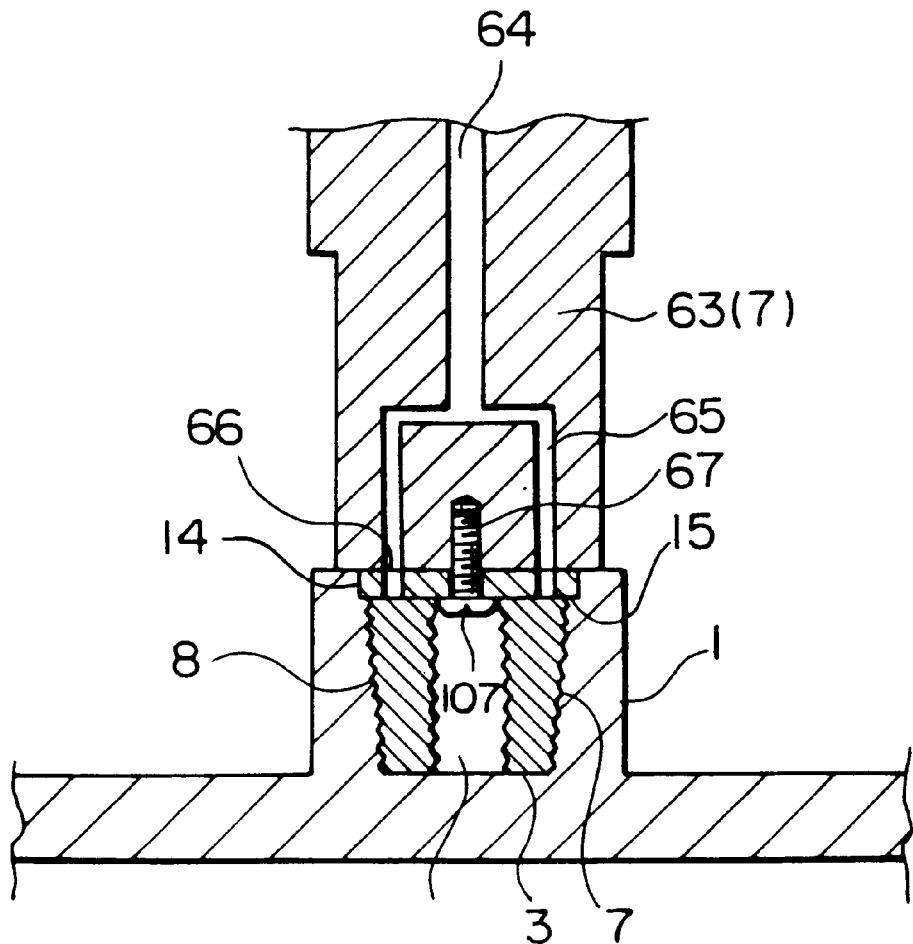
FIG. 6A is an elevational sectional view showing an example of the pressure fitting tool and a part pressure fitted by the same.
Figures 6B, 6C:
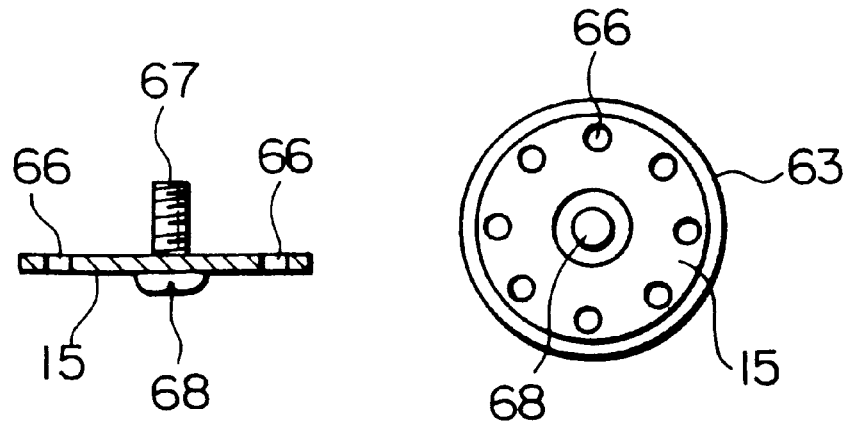
FIG. 6B is a sectional view showing an auxiliary tool.
FIG. 6C is a view for describing the position relation between the pressure fitting tool and the auxiliary tool shown in FIG. 6A.

FIGS. 6A to 6C show a different example of holder 7, which is of an air suction type. A lower end portion, i.e., support portion 63, of the pressure fitting tool 9 has an air suction bore 64 (about 1 mm in diameter), which is branched into branches 65 (substantially the same as or slightly smaller in diameter than the air suction bore 64 open at its tip surface. A disc-like auxiliary member 15 having radially uniformly spaced-apart communication holes 66, is secured by a set screw 67 to the tip surface of the support portion 63, thus connects each branches 65 and each communication holes 66. The head 68 of the set screw 67 has a diameter slightly smaller than the diameter of the threaded hole 62 of the part 3, so that it will be fitted in the threaded hole 62 when the holder 7 is pushed against the top of the part 3. With this structure of the auxiliary member 15, by lowering the holder 7 the head 68 of the set screw 67 is first fitted as a positioning guide in the threaded hole 62 of the part 3, and subsequent the auxiliary member 15 is pushed against the top of the part 3. Then, by sucking out air inside the air suction bore 64 by using an external sucking device, air inside the branches 65 and the communication holes 66 is also sucked out. Thus, the part 3 which the auxiliary member 15 has been pushed against, can be held by air suction by the holder 7. The holder 7 releases the part 3 when the air suction is released. The outer diameter of the auxiliary member shown in FIGS. 6A to 6C, is set to be greater than the outer diameter of the top of the part 3 and slightly smaller than the diameter of the large diameter portion 14 of the pressure fitting hole 8 of the work 1. Thus, when the part 3 held by suction by the holder 7 is pressure fitted in the part fitting hole 8, the auxiliary member 15 is close contact fitted the large diameter portion 14 of the part fitting hole 8. By way of example, where the tip surface of the support portion 63 has an outer diameter of about 6 mm and the large diameter portion 14 of the part fitting hole 8 has a diameter of about 4 mm and a depth of about 0.3 mm, it is preferable to set the diameter of the auxiliary member 15 to about 4 mm and the thickness thereof to about 0.3 mm. The auxiliary member 15 can be replaced when it is worn out after repeated use.

In the case of the holder 7 of the air suction type as shown in FIGS. 6A and 6B, it is desirable to transmit an ultrasonic wave via the air suction bore 64 and the branches 65 thereof to the entirety of the holder 7 to pressure fit the part 3 held and vibrated thereby in the part fitting hole 8 of the work 1. The part 3 being vibrated can be pressure fitted and secured in position in the part fitting hole 8 without need of softening the wall around the pressure fitting hole 8 by heating it. Thus, in this case the heater 5 is unnecessary.

Figure 7A:
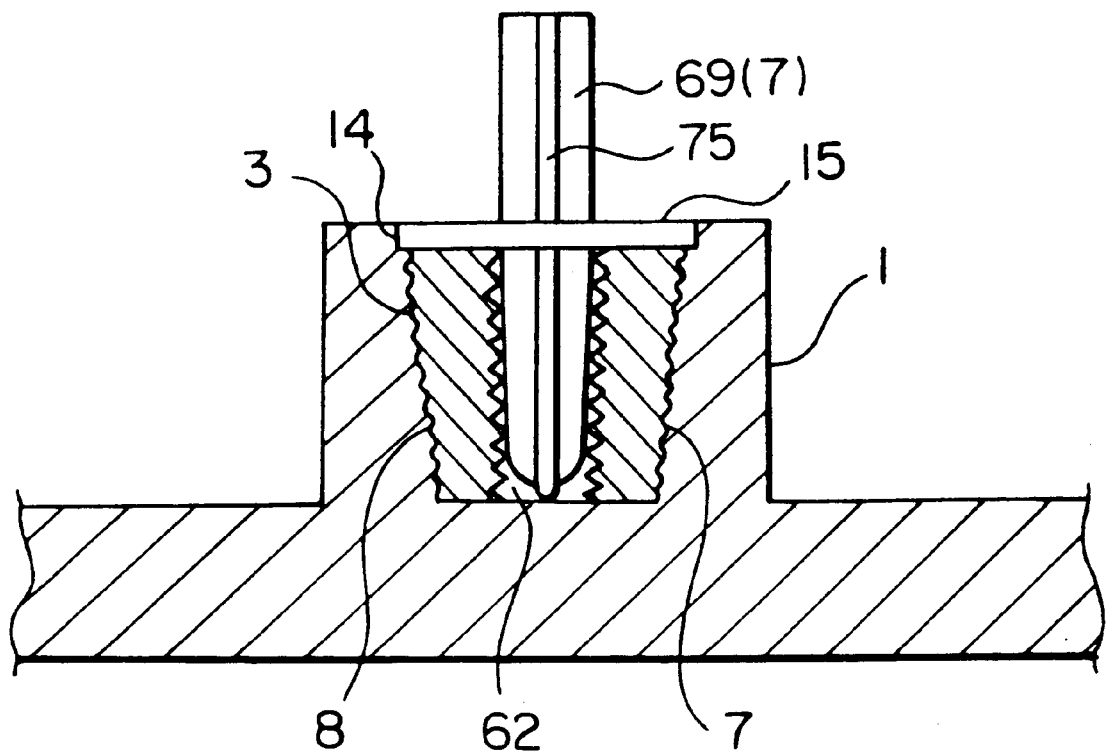
FIG. 7A is an elevational sectional view showing a different example of the pressure fitting tool and a part pressure fitted by the same.
Figure 7B:
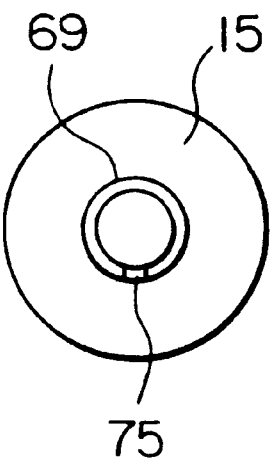
FIG. 7B is a view for describing the position relation between the holder and auxiliary tool shown in FIG. 7A.

FIGS. 7A and 8B show the holder 7 of tube type using a metal tube 69. The metal tube 69 has a tapered tip and a longitudinal slit 75. The outer diameter of the metal tube 69 is reduced by applying to the tube 69 from the outside, and is restored to the initial diameter by releasing the pressure. In this way, the tube 69 has a spring character. Thus, when the tube 69 is inserted in the threaded hole 62 of the part 3, the part 3 is taken hold of by the metal tube 69 with the outer periphery thereof in close contact with the surface of the threaded hole 62. When the tube 69 is pulled out from the threaded hole 62, it is automatically restored to the initial outer diameter state. This holder 7 has a ring-like auxiliary member 15 fitted on it at a central position in the longitudinal direction. When the part 3 held by the holder 7 is pressure fitted in the part fitting hole 8 of the work 1, the auxiliary member 15 is close contact fitted in the large diameter portion 14 of the part fitting hole 8.

Figure 10:
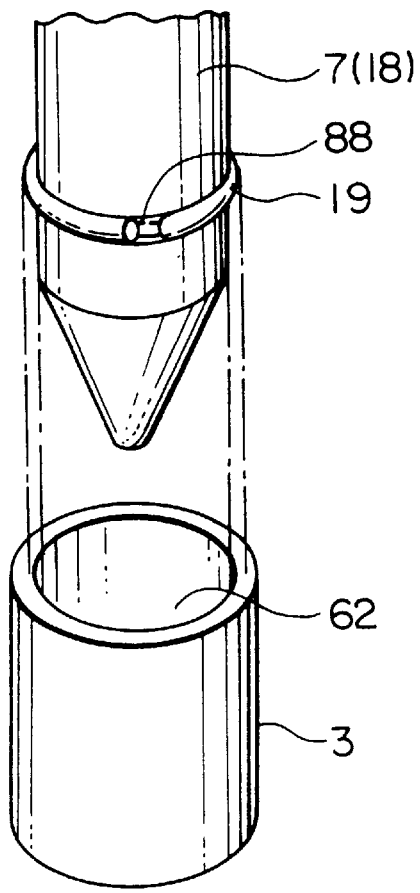
FIG. 10 is a view for describing a holder in a fourth embodiment of the invention.

The holder 7 may not be those shown in FIGS. 1 and 3A to 3D to 7A and 7B, but it may also be an openable collet chuck, spring opening type chuck or a shape memory alloy tube, the outer diameter of which is variable by heat, or it may further be what is shown in FIG. 10 as will be described later.

The control system 10 controls the operations of the X- and Y-axis movable tables 26 and 30, the pressure fitting tool 9 and so forth as well as the timings of these operations. As shown in FIG. 1, the control system 10 includes a CNC controller 71 and a console 72. Various operational conditions of the apparatus such as the positioning and speed of the work bench 2, the speeds of feeding and pressure fitting parts 3 and so forth, are programmed in the console 72. According to these programs, the CNC controller 71 causes predetermined operations of the X- and Y-axis movable tables 26 and 30, the pressure fitting tool 9 and so forth. Upon depression of a pedal type start switch 73 as shown in FIG. 1, the control system 10 is started to deliver predetermined commands for operating the X- and Y-axis movable tables 26 and 30, the pressure fitting tool 9 and so forth, and when predetermined operations are ended, it is automatically stopped to be held inoperable until the next depression of the start switch 73.

The apparatus for automatically pressure fitting parts according to the invention operates in use as follows.

(1) Parts 3 are fed out in a predetermined orientation from one of the parts feeders 21 to the parts guide 4 to be fed along the same to the heater 5, and is heated as it is fed through the heater 5 before being fed to and set in the setting position 6. This operation is normally brought about.

(2) By setting the work 1 on the work bench 2 and then depressing the start switch 73, the air suction mechanism 11 causes the work 1 on the work bench 2 to be sucked thereto. Thus, the work 1 is corrected for strains, bending and so forth, and is secured to the work bench 2 in this state.

(3) The control system 10 then controls the X- and Y-axis movable tables 26 and 30 for movement thereof. These tables 26 and 30 are stopped when the pertinent part fitting hole 8 of the work 1 is brought to a position underneath the setting position 6.

(4) The control system 10 then causes lowering of the pressure fitting tool 9. The holder 7 is thus pushed against the part 3 set in the setting position 6, and takes hold of the part 3 by suction or the like.

(5) The pressure fitting tool 9 is continually lowered to lower the part 3. At this time, the blocks 54 are opened, allowing the pressure fitting tool 9 to be lowered until the part 3 held by the holder 7 is pressure fitted to a predetermined depth in the part fitting hole 8 of the work 1. The pressure fitted part 3 softens the wall around the part fitting hole 8, causing migration of the softened resin to the outer periphery of the part 3. During this time, the heated parts 3 in the heater 5 are prevented by the outer periphery of the pressure fitting tool 9 from being fed, and are thus held stationary in that location. Also, the blocks 54 are held open.

(6) Subsequently, the pressure fitting tool 9 is raised back together with the holder 7. The holder 7 thus gets out of the part 3 now held pressure fitted and secured in position in the part fitting hole 8. When the pressure fitting tool 9 being raised back to its initial upper set position clears the blocks 54 in the open state, the blocks 54 are closed to restore the initial state. As a result, only the foremost one of the heated parts 3 is fed from the heater 5 to and set in the setting position 6, which is formed by the blocks 54. During this time, the X- and Y-axis movable tables 26 and 30 are moved to bring the next part fitting hole 8 of the work 1 for pressure fitting the next part 3 to the position underneath the setting position 6.

(7) The above sequence of operations (2) to (6) is repeated to pressure fit parts 3 in predetermined part fitting holes 8 of the work 1.

While the above description of the operation has concerned with the operations of one set of parts feeder 21, parts guide 4, heater 5 and pressure fitting tool 9, it is also possible to operate the three sets of parts feeders 21, parts guides 4, heater 5 and pressure fitting tools 9 shown in FIG. 1 at a time. In this case, three different kinds of parts 3 can be simultaneously pressure fitted in different part fitting holes 8 by the three pressure fitting tools 9. It is further possible to Increase the number of different kinds of parts 3 that can be pressure fitted at a time by increasing the number of sets of the parts feeders 21, parts guides 4, heater 5 and pressure fitting tools 9. Moreover, different kinds of parts 3 can be pressure fitted by replacing the set of the parts feeder 21, parts guide 4, heater 5 and pressure fitting tool 9 with a different set.

Embodiment 2

Figure 8:
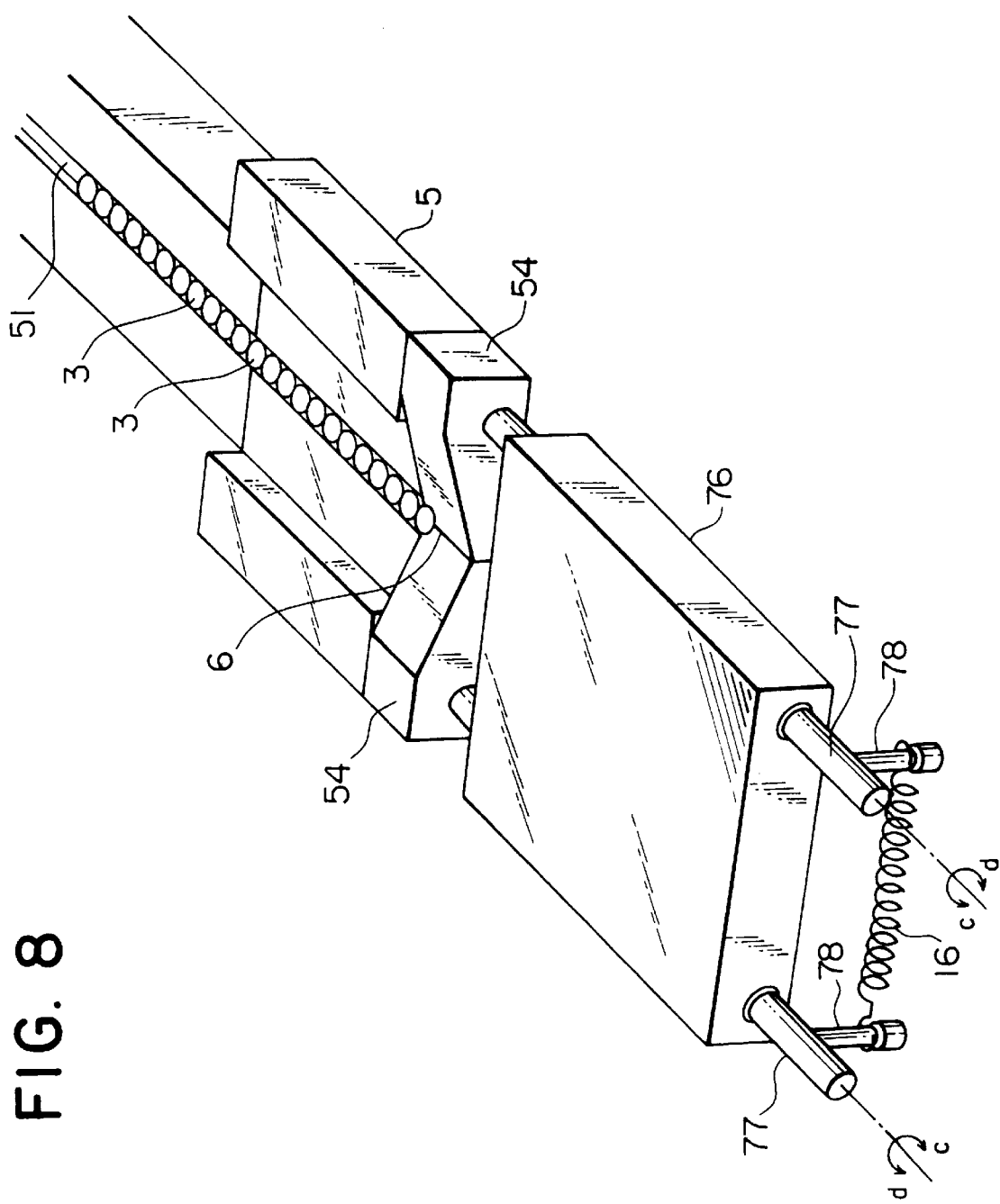
FIG. 8 is a view for describing a second embodiment of the automatic parts pressure fitting apparatus according to the invention.

A second embodiment of the invention will now be described with reference to FIG. 8. In this apparatus for automatically pressure fitting parts, the pair blocks 54 which are disposed adjacent to the forward end of the heater 5, are each mounted on an end of each of two rods 77 penetrating a case 76. The blocks 54 are rotated downward when the pressure fitting tool 9 is lowered subsequent to the insertion of the holder 7 in the part 3 set in the setting position 6 formed by them, and are rotated reversely to be restored when the pressure fitting tool 9 being raised to the initial position clears them. The rod 77 each have an arm 78 downwardly extending from the outer end of them. A coil spring 16 is connected as restoring means between the two arms 78 to upwardly bias the block 54. With the rods 77 penetrating the case 76, a neat construction can be obtained, thus reducing contamination of or dust attachment to the rods 77 to reduce causes of operation failures or troubles.

Embodiment 3

Figure 9A:
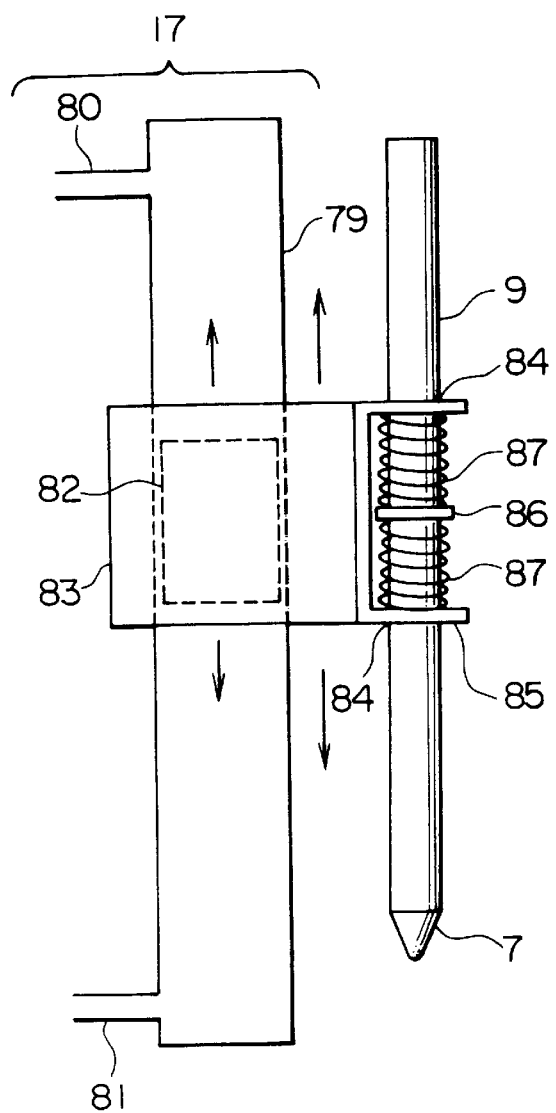
FIG. 9A is a view showing a magnet type rod-less cylinder according to the invention.
Figure 9B:
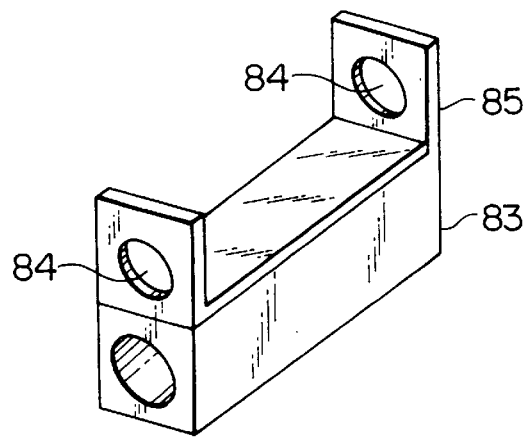
FIG. 9B is a view for describing an example of holder support.

A third embodiment of the invention will now be described with reference to FIGS. 9A and 9B. This apparatus for automatically pressure fitting parts is the same as Embodiment 1 in the basic construction, and is different therefrom only in that the pressure fitting tool 9 is driven for reciprocation by a magnet type rod-less cylinder 17. As shown in FIG. 9A, the rod-less cylinder 17 has an upper and a lower air passage 80 and 81 of the cylinder 79, and accommodates an inside magnet 82 slidable along it. By supplying air through the upper air passage 80 into the cylinder 79 and exhausting air therefrom through the lower air passage 81, the inside magnet 82 is lowered along the cylinder 79. On the other hand, by supplying air through the lower air passage 81 into the cylinder 79 and exhausting air therefrom through the upper air passage 80, the inside magnet 82 is raised. With the vertical displacement of the inside magnet 82, an outside magnet 83 is also vertically displaced in sliding contact with the outer periphery of the cylinder 79 and together with a channel-shaped tool support 85 secured to it. The tool support 85 supports the pressure fitting tool 9, and its vertical displacement also causes vertical displacement of the pressure fitting tool 9 in the same direction. The pressure fitting tool 9 penetrates holes 84 of the channel-shaped tool support 85, and is supported in the same via springs 87 disposed between the upper and lower bent portions of the channel-shaped tool support 85 and a flange 86 secured to the pressure fitting tool 9 at an intermediate position thereof. When the pressure fitting tool 9 is lowered for pressure fitting the part 3 held by the holder 7 in the part fitting hoe 8 of the work 1, or when it is raised, a force in excess of a predetermined level may be exerted to it in the axial direction due to some cause. In such a case, the springs 87 will absorb the exerted force and eliminate irrational forces exerted or damages to the pressure fitting tool 9 or part fitting hole 8.

Embodiment 4

A fourth embodiment of the invention will now be described with reference to FIGS. 10A and 10B. This apparatus for automatically pressure fitting parts is the same as Embodiment 1 in the basic construction, and is different therefrom only in that the holder 7 has a structure as shown in FIG. 10. As shown in FIG. 10, the holder 7 is a rod 18, which has a diameter slightly smaller than the diameter of the threaded hole 82 of the part 3 so that it can be inserted into the threaded hole 62. The outer periphery of the rod 18 has an annular groove 88 formed at a position near the lower end of the rod 18, and an engagement ring (i.e., C-ring) 19 is fitted in the annular groove 88. The holder 7 has a tapered tip so that it can be readily inserted into the threaded hole 62 of the part 3. The engagement ring 19 has an outer diameter slightly greater than the diameter of the threaded hole 62 of the part 3, and it is also capable of being radially elongated and contracted and thus changing its outer diameter by an external radial force applied to it.

Figure 11A:
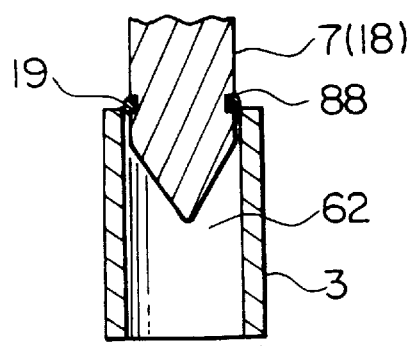
FIGS. 11A and 11B are views for describing how the same holder holds a part.
Figure 11B:
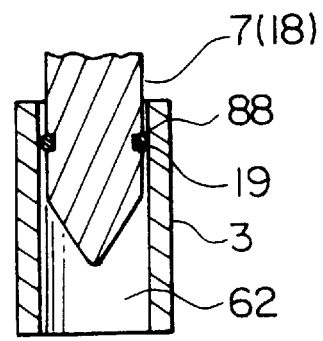

When the holder 7 is lowered so that its tip is inserted into the threaded hole 62 of the part 3, the engagement ring 19 is brought into engagement with the top of the part 3 as shown in FIG. 11A. When the holder 7 is further lowered, the engagement ring 19 is radially inwardly pushed by the edge of the threaded hole 62, and thus reduces its outer diameter. Thus, the engagement ring 19 is fitted in the threaded hole 62 to be in close contact with the surface of the threaded hole 62 as shown in FIG. 1B. The part 3 is thus held by the holder 7. When the holder 7 is further lowered, the blocks 54 having been supporting the part 3 are opened, allowing the part 3 to be pressure fitted in the part fitting hole 8. When the pressure fitting tool 9 is raised, the holder 7 gets out together with the engagement ring 19 from the threaded hole 62 to leave the part 3 therein, thus completing the pressure fitting. The engagement ring 19 may not be the C-ring, so long as it can be forced into the threaded hole 62 of the part 3 to be in close contact with the surface of the threaded hole 62 and restored by its own restoring force to the initial outer diameter when it gets out of the threaded hole 62.

Embodiment 5

Figure 12:
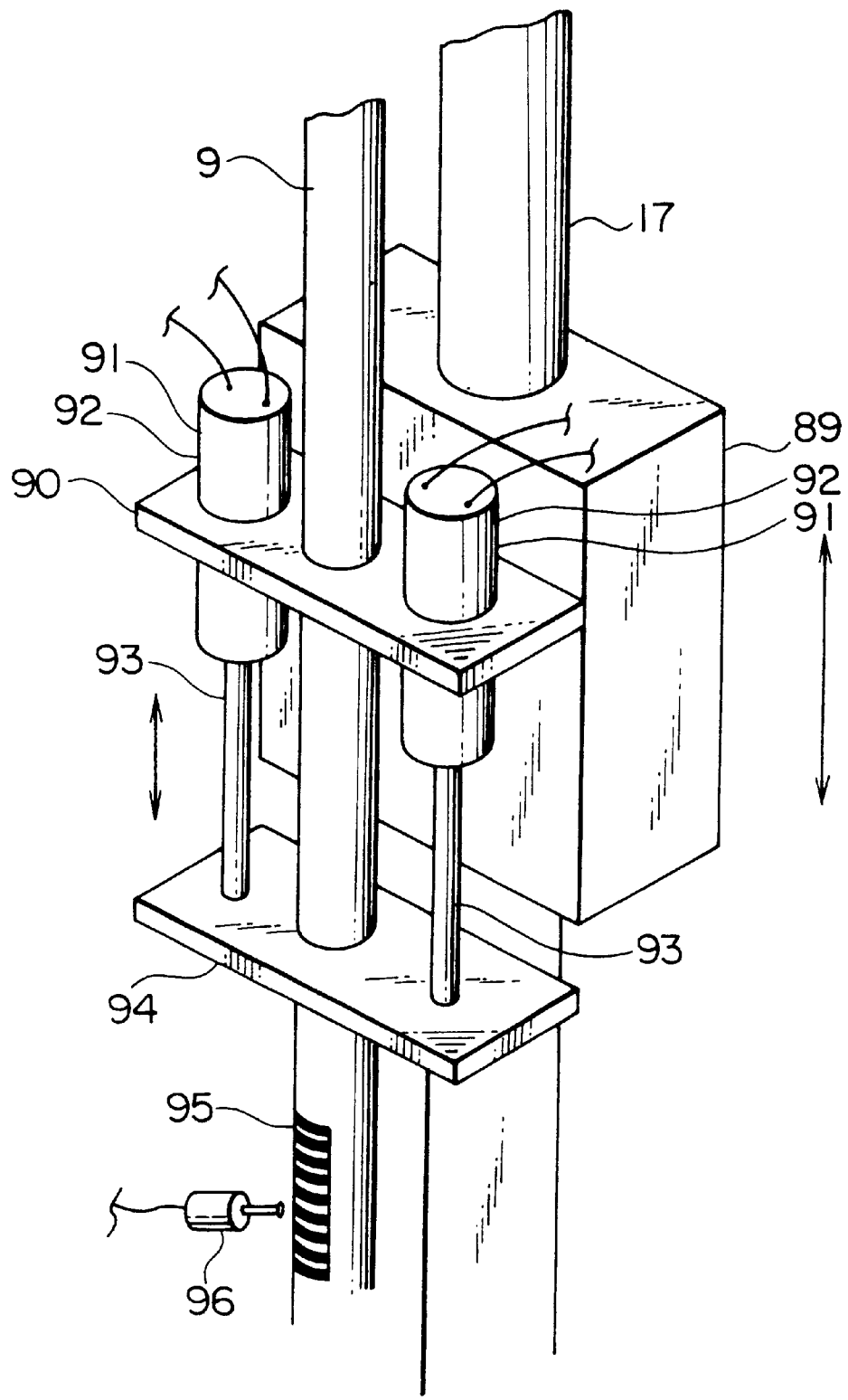
FIG. 12 is a view for describing a driving mechanism for driving a pressure fitting tool in a fifth embodiment of the invention.
Figure 13:
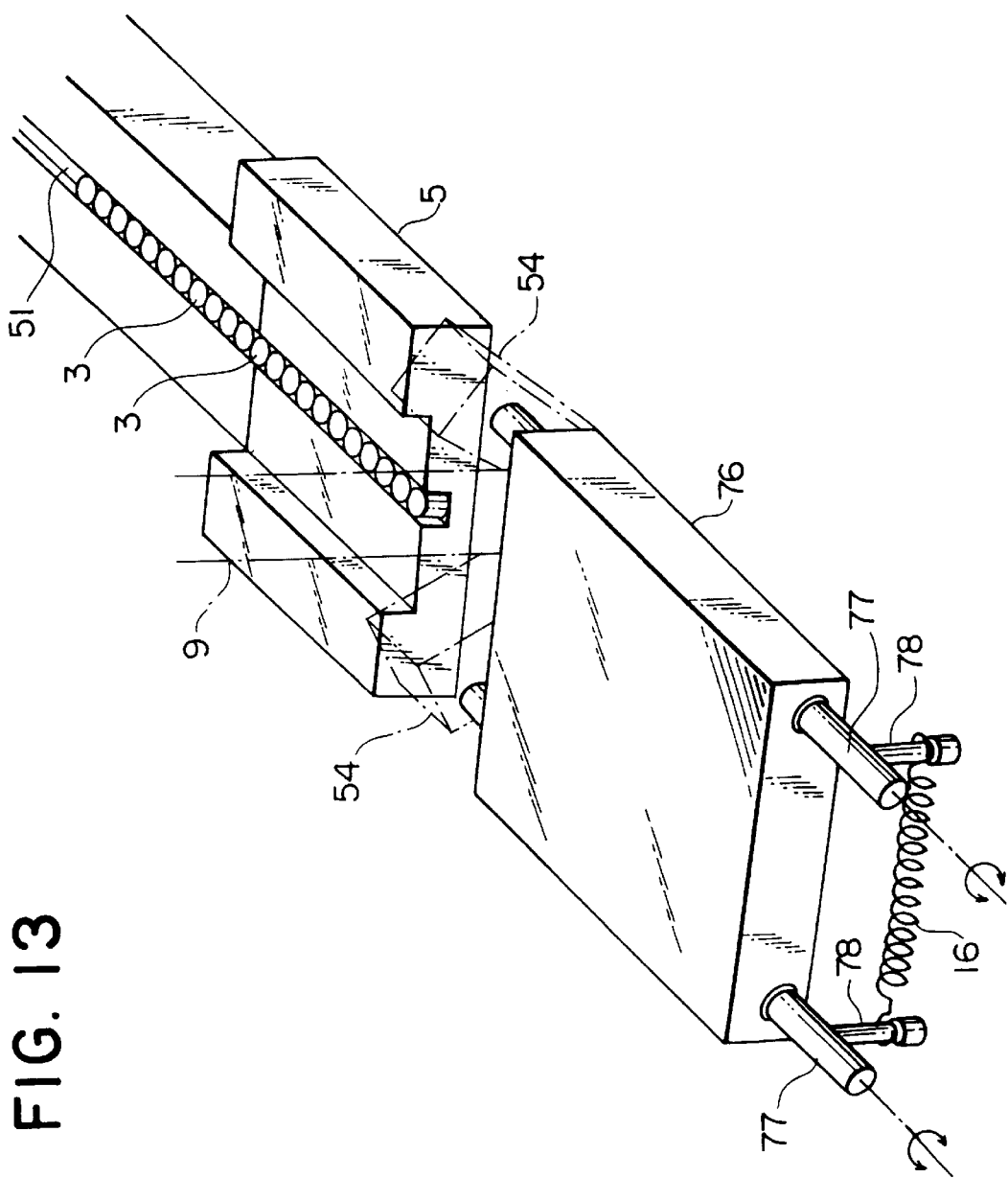
FIG. 13 is a view for describing how a pressure fitting tool according to the invention blocks a parts passage in a heater.

A fifth embodiment of the invention will now be described with reference to FIGS. 12 and 13. This apparatus for automatically pressure fitting parts is the same as Embodiment 1 in the basic construction, and is different therefrom in that it further has the following function. After the end of the pressure fitting of the last part 3 in the last one of a number of part fitting holes 8 of a work 1 and until the start of the pressure fitting of parts 3 in the part fitting holes 8 of the next work 1, the pressure fitting tool 9 prohibits the feeding of the heated parts 3 to the setting position 6 and holes these parts 3 waiting in the heater 5, so that the waiting parts 3 are continually heated and not cooled down. This is attained by an arrangement as shown in FIG. 12. As shown, the outside magnet 89 which is slidable along the rod-less cylinder 17, has a cylinder support member 90 secured thereto and extending side-wise. Two air cylinders 91 have their cylinders penetrating and secured to the cylinder support member 90. The air cylinders 91 have their rods 93 secured at the end thereof to a rod support member 94. The pressure fitting tool 9 penetrates the cylinder and rod support members 90 and 94, and it is not secured to but slidable relative to the cylinder support member 90 while it is secured to the rod support member 94. In this apparatus for automatically pressure fitting parts, when the outside magnet 89 is vertically displaced by the magnet type rod-less cylinder 17, the cylinder support member 90, the air cylinders 91 and the rod support member 94 are also vertically displaced. At this time, the pressure fitting tool 9 is vertically displaced in unison with the rod support member 94. This is brought about to pressure fit the part 3 in the part fitting hole 8. More specifically, this operation is brought about for reciprocating the pressure fitting tool 9 while holding the rods 93 of the air cylinders 91 retreated. After the parts 3 have been pressure fitted in all the part fitting holes 8 of one work 1 in this way, the pressure fitting tool 9 is raised up to an intermediate position by the magnet type rod-less cylinder 17, and also the rods 93 of the air cylinders 91 are advanced, so that the pressure fitting tool 9 will be at a position lower than the position otherwise assumed. That is, as shown in FIG. 13, the pressure fitting tool 9 is stopped at a position that its outer periphery closes the outlet of the guide groove 51 of the heater 5. Thus, the heated parts can all be held waiting in the guide groove 51.

As described before, the work 1 after the pressure fitting of parts 3 in all its necessary part fitting holes 8 is taken out from the work bench 2, and the next work 1 is set on and secured to the work bench 2. Subsequently, the rods 93 of the air cylinders 91 are retreated, thus raising the pressure fitting tool 9 up to the normal level position and opening again the outlet of the guide groove 51 to permit the feeding of the heated parts 3 to the setting position 6. Afterwards, the pressure fitting of parts in the part fitting holes 8 of the new work 1, is brought about by raising the pressure fitting tool 9. It is to be appreciated that during the renewal of the work 1 on the work bench 2, the heated parts 3 are reliably held waiting in predetermined positions to be continually heated and thus not cooled down.

The interlocked operation of the magnet type rod-less cylinder 17 and the air cylinders 91 is, for instance, realized as follows. As shown in FIG. 12, a predetermined interval alternate white-and-black mark pattern 95, is applied to or provided by impression on the outer periphery of the pressure fitting tool 9, and in the vicinity of this pattern 95 an optical sensor 96 is disposed, which provides an "on"/"off" signal by detecting the alternate white and black marks. The control system 10 monitors this "on"/"off" signal, and it is preliminarily programmed as follows. When the control system 10 receives the "on"/"off" signal a plurality of times, it determines that the pressure fitting tool 9 is normally reciprocated. When the control system 10 does not receive the "on"/"off" signal for a predetermined period of time, it determines that the pressure fitting tool 9 has been completely raised or lowered. The control system 10 counts the number of times of rising or lowering of the pressure fitting tool 9. When the pressure fitting tool 9 has been lowered a number of times corresponding to the number of the part fitting holes 8 of the work 1, the control system 10 causes air supply to the air cylinders 91 to advance the rods 93 thereof while the pressure fitting tool 9 is raised after depressing part 3, thereby the pressure fitting tool 9 closes the outlet of the guide groove 51 of the heater 5. After subsequent lapse of a predetermined time (necessary for the renewal of the work 1 on the work bench 2), the control system 10 causes retreat of the rods 93 of the air cylinders 91 to raise the pressure fitting tool 9 up to the normal level position. The maximum stroke of the air cylinders 91 is suitably about 20 mm.

The mark pattern 95 and the sensor 96 may also be utilized for controlling movement of the work bench 2 in the X- and Y-axis directions to bring each part fitting hole 8 of the work 1 to the position underneath the setting position 6. Specifically, the control system 10 is programmed such that when it determines that the pressure fitting tool 9 has been completely raised after the end of the pressure fitting of the parts 3 in the part fitting holes 8 of the work 1 as noted above, it delivers a command to the drive mechanism for the work bench 2 such that the next part fitting hole 8 of the work 1 is to be brought to the position right underneath the pressure fitting tool 9.

If the mark pattern 95 is a mere white-and-black mark pattern, the sensor 96 provides only either "on" or "off" part of the "on"/"off" signal when the work 1 that is set has a height less than the width of the white or black mark part of the mark pattern 95. In such a case, the control system 10 can not detect the rising and lowering of the pressure fitting tool 9. The above predetermined internal alternate white-and-black mark pattern 95 precludes this problem.

EFFECTS OF THE INVENTION

The apparatus for automatically pressure fitting parts according to the invention has the following effects.

(1) Since the apparatus is automatic, it permits accurately and quickly pressure fitting parts in works.

(2) Since the apparatus is automatic, it eliminates any missing part fitting hole left without a part pressure fitted therein even with a work having a large number of part fitting holes.

(3) Since parts are heated while they are fed through the heater, unlike the prior art apparatus, no preparations for the heating are necessary.

(4) Since a large number of different kinds of parts can be pressure fitted at a time, it is possible to obtain 30 to 40% cost reduction compared to the apparatus permitting the pressure fitting of only a single kind of part.

(5) Since the apparatus is automatic, a number of different kinds of parts can be pressure fitted in the work at a time.

(6) It is possible to pressure fit parts having different shapes and structures in the work by merely replacing the parts feeder, the parts guide and the pressure fitting part.

(7) It is possible to eliminate missing of pressure fitting even with a work having a large number of pressure fitting positions.

(8) Since the apparatus is automatic, it is possible to eliminate fluctuations of pressure fitting and ensure uniform finish, thus reducing rejected products.

(9) Since the work bench for setting a work thereon is movable in the X- and Y-axis directions, it is possible to reduce position deviation of parts.

(10) Since the apparatus is automatic, the operator is hardly injured during operation.

(11) Parts can be reliably and readily set in the setting position and released.

(12) By vibrating the holder with an ultrasonic wave to vibrate the part that is held and pressure fit the part being vibrated in the part fitting hole of the part, it is possible to pressure fit the part reliably without need of heating the part.

(13) By causing reciprocation of the pressure fitting tool with the magnet type rod-less cylinder, it is possible to lower and raise the pressure fitting tool quickly and smoothly.

(14) With the holder including the rod, which can be inserted into the threaded hole of the part, and the engagement ring, which is provided on the rod near the tip thereof, has an outer diameter greater than the diameter of the rod and also than the diameter of the threaded hole of the part, is capable of changing the diameter and has a restoring force, it is possible to reliably take hold of even a small part without possibility of falling of the part from the holder during the pressure fitting.

(15) When the pressure fitting of a part in the last part fitting hole of a work has been ended, the pressure fitting tool is caused to close the outlet of the guide groove of the heater, thus prohibiting the feeding of the heated parts in the heater until the start of the pressure fitting of parts in the next work. Thus, until the start of the pressure fitting of works in the next work, the heated parts are held waiting in the guide groove without their temperature reduction.

(16) With the suction mechanism for sucking and securing the work from the back side, the work can be corrected for strain, deformation and so forth. Thus, it is possible to perpendicularly pressure fit the part in the part fitting hole and eliminate slanted pressure fitting and other defective results.

(17) The setting position has a part support surface, which is lower in level than the part support surface of the part support surface of the parts guide behind it, and also has opposite side surfaces flaring upward from the part support surface. Thus, parts fed one after another to the setting position will not overlap one another, and it is not possible that a part succeeding the pertinent part is erroneously pressure fitted in the work.

(18) With the sensor for checking whether a part has been set in the setting position, it is possible to eliminate idle lowering of the pressure fitting tool into the part fitting hole.

What is claimed is:

1. An apparatus for automatically pressure fitting parts, comprising:

a work bench for setting a work thereon;

a control system for controlling the operations of the apparatus;

a drive mechanism for driving the work bench in an X- and a Y-axis direction, under the control of the control system every time the pressure fitting of a part is finished, thereby moving the next part fitting hole in the work underneath a part setting position;

a parts guide, which parts to be pressure fitted in the work are fed along in a row;

a heater for heating the parts being fed;

a setting position where each heated part fed thereto is set;

a pressure fitting tool that moves up and down, thereby causing the pressure fitting of the part in a part fitting hole of the work set on the work bench; and a holder composed of two blocks capable of taking hold of the heated part set in the setting position and releasing the held part by being pushed open downward and outward by the pressure fitting tool being lowered, thereby pressure fitting the part in a part fitting hole of the work, the holder being closed into an original state when it is released by the pressure fitting tool during the upward motion.

2. An apparatus for automatically pressure fitting parts, comprising:

a work bench for setting a work thereon;

a control system for controlling the operations of the apparatus;

a drive mechanism for driving the work bench in an X- and a Y-axis direction, under the control of the control system every time the pressure fitting of a part is finished, thereby moving the next part fitting hole in the work underneath a part setting position;

a parts guide, which parts to be pressure fitted in the work are fed along in a row;

a setting position where each heated part fed thereto is set;

a pressure fitting tool that moves up and down, thereby causing the pressure fitting of the part in a part fitting hole of the work set on the work bench;

a holder composed of two blocks capable of taking hold of the part set in the setting position, and releasing the held part by being pushed open downward and outward by the pressure fitting tool being lowered, thereby pressure fitting the part in a part fitting hole of the work, the holder being closed into an original state when it is released by the pressure fitting tool during the upward motion; and the pressure fitting tool or holder being capable of being vibrated with an ultrasonic wave, thereby causing vibration of the held part and effecting the pressure fitting thereof being vibrated in the part fitting hole of the work.

3. The apparatus for automatically pressure fitting parts according to claim 1, wherein the pressure fitting tool is capable of being reciprocated by a magnet type rod-less cylinder.

4. The apparatus for automatically pressure fitting parts according to claim 1, wherein the holder includes a rod capable of being inserted into a threaded hole of the parts, and an engagement ring fitted on the rod at a position thereof near the lower end, the engagement ring having an outer diameter greater than the diameter of the rod and also the diameter of the threaded hole and also having a restoring force for changing its outer diameter.

5. The apparatus for automatically pressure fitting parts according to claim 1, wherein the pressure fitting tool is capable of being held at a position to prohibit the feeding of parts having been heated by the heater to the setting position by the parts guide after the end of the pressure fitting of the last part in a part fitting hole of the work and until the start of the pressure fitting of parts in the next work.

6. The apparatus for automatically pressure fitting parts according to claim 1, wherein the work bench includes a sucking mechanism for securing the work by suction force exerted thereto from the back side.

7. The apparatus for automatically pressure fitting parts according to claim 1, wherein the setting position has a part support surface, which is lower in level than the part support surface of the parts guide preceding it, and also has opposite side surfaces flaring upward such that the part on the part support surface will be raised along the opposite side surfaces when pushed by the next part fed along the parts guide.

8. The apparatus for automatically pressure fitting parts according to claim 1, which further comprises a part sensor that checks whether a part has been set in the setting position, causing the pressure fitting tool to activate when the part sensor determines that the pressure fitting hole of a part is in the setting position.

9. The apparatus for automatically pressure fitting parts according to claim 1, wherein the pressure fitting tool is capable of being reciprocated by a magnet type rod-less cylinder, and also being held at a position to prohibit the feeding of the parts having been heated by the heater to the setting position along the parts guide after the end of the pressure fitting of the last part in a part fitting hole of the work and until the start of the pressure fitting of parts in the next work.

10. The apparatus for automatically pressure fitting parts according to claim 1, wherein the pressure fitting tool is capable of being reciprocated by a magnet type rod-less cylinder, and also being held at a position to prohibit the feeding of parts having been heated by the heater to the setting position along the parts guide after the end of the pressure fitting of the last part in a part fitting hole of the work and until the start of the pressure fitting of parts in the next work, and the holder includes a rod capable of being inserted into a threaded hole of the parts, and an engagement ring fitted on the rod at a position thereof near the lower end, the engagement ring having an outer diameter greater than the diameter of the rod and also the diameter of the threaded hole and also having a restoring force for changing its outer diameter.

11. The apparatus for automatically pressure fitting parts according to claim 2, wherein the pressure fitting tool is capable of being reciprocated by a magnet type rod-less cylinder.

12. The apparatus for automatically pressure fitting parts according to claim 2, wherein the holder includes a rod capable of being inserted into a threaded hole of the parts, and an engagement ring fitted on the rod at a position therefore near the lower end, the engagement ring having an outer diameter greater than the diameter of the rod and also the diameter of the threaded hole and also having a restoring force for changing its outer diameter.

13. The apparatus for automatically pressure fitting parts according to claim 2, wherein the pressure fitting tool is capable of being held at a position to prohibit the feeding of parts having been heated by the heater to the setting position by the parts guide after the end of the pressure fitting of the last part in a part fitting hole of the work until the start of the pressure fitting of parts in the next work.

14. The apparatus for automatically pressure fitting parts according to claim 2, wherein the work bench includes a sucking mechanism for securing the work by suction force exerted thereto from the back side.

15. The apparatus for automatically pressure fitting parts according to claim 2, wherein the setting position has a part support surface, which is lower in level than the part support surface of the parts guide preceding it, and also has opposite side surfaces flaring upward such that the part on the part support surface will be raised along the opposite side surfaces when pushed by the next part fed along the parts guide.

16. The apparatus for automatically pressure fitting parts according to claim 2, which further comprises a part sensor that checks whether the part has been set in the setting position, causing the pressure fitting tool to activate when the part sensor determines that the pressure fitting hole of the part is in the setting position.

17. The apparatus for automatically pressure fitting parts according to claim 2, wherein the pressure fitting tool is capable of being reciprocated by a magnet type rod-less cylinder, and also being held at a position to prohibit the feeding of the parts having been heated by the heater to the setting position along the parts guide after the end of the pressure fitting of the last part in a part fitting hole of the work and until the start of the pressure fitting of parts in the next work.

18. The apparatus for automatically pressure fitting parts according to claim 2, wherein the pressure fitting tool is capable of being reciprocated by a magnet type rod-less cylinder, and also being held at a position to prohibit the feeding of parts having been heated by the heater to the setting position along the parts guide after the end of the pressure fitting of the last part in a part fitting hole of the work and until the start of the pressure fitting of parts in the next work, and the holder includes a rod capable of being inserted into a threaded holed of the parts, and an engagement ring fitted on the rod at a position thereof near the lower end, the engagement ring having an outer diameter greater than the diameter of the rod and also the diameter of the threaded hole and also having a restoring force for changing its outer diameter.

* * * * *